United States Patent [19]

Walker et al.

[11] 4,366,427

[45] Dec. 28, 1982

[54] PROTECTIVE METHOD AND APPARATUS FOR A CONTROLLED CURRENT INVERTER AND MOTOR CONTROL SYSTEM

[75] Inventors: Loren H. Walker, Salem; John H. Cutler, Roanoke, both of Va.

[73] Assignee: General Electric Company, Salem, Va.

[21] Appl. No.: 142,656

[22] Filed: Apr. 22, 1980

[51] Int. Cl.³ .............................................. H02P 5/40
[52] U.S. Cl. .................................... 318/798; 318/762; 318/803; 318/807
[58] Field of Search ............... 318/762, 757, 758, 759, 318/703, 803, 805, 808, 798; 363/57, 58

[56] References Cited

U.S. PATENT DOCUMENTS 3,859,579  1/1975  Plunkett .............................. 318/805
4,230,979 10/1980  Espelage et al. ..................... 318/803

Primary Examiner—David Smith, Jr.

Attorney, Agent, or Firm—Arnold E. Renner; James H. Beusse

[57] ABSTRACT

A controlled current inverter system forms the basis of an AC motor drive system for furnishing a motor load 22 with a variable frequency, variable magnitude AC current from a thyristor controlled DC to AC inverter 16 which is supplied current from a thyristor controlled AC to DC converter 10 by way of a DC link including an inductor 14. The frequency of the inverter is controlled by means of a control circuit including a voltage controlled oscillator 18. In the event that the converter 10 operates in such manner as to place a short circuit across the DC link 14 during a regenerative mode of operation of the motor 22, apparatus 36 is shown and described and a method is disclosed for providing a momentary advance gating of the inverter 16 which causes the motor 22 to shift from the existing regenerative mode toward a motoring mode and thereby quench any build-up of excessive converter-inverter circulating currents.

18 Claims, 4 Drawing Figures

PROTECTIVE METHOD AND APPARATUS FOR A CONTROLLED CURRENT INVERTER AND MOTOR CONTROL SYSTEM

CROSS REFERENCE TO RELATED APPLICATION

The subject invention is related to U.S. Pat. No. 4,230,979 entitled, "Controlled Current Inverter and Motor Control System," issued Oct. 28, 1980 in the names of Paul M. Espelage, et al., which application is also assigned to the assignee of this invention and is specifically incorporated hereinto by reference.

BACKGROUND OF THE INVENTION

The present invention relates generally to controlled current inverter drive systems for powering an AC motor load, and more particularly to means for preventing unacceptably high levels of motor current from occurring as a result of system response to abnormal operating conditions.

In the past, DC (direct current) motors have been used for operation over a wide speed range as desired. More recently, AC motors have been finding greater application in variable speed drive applications. This is due in a large measure to the fact that an AC induction motor for example is inherently rugged, thereby reducing maintenance problems due to the lack of brushes, which makes AC motors particularly desirable for certain applications. There are, however, certain problems associated with the use of AC motors, particularly when the motor is supplied by power from a variable frequency thyristor controlled inverter (DC to AC) which in turn is fed power from a thyristor controlled converter (AC to DC).

In the above cross-referenced related U.S. Pat. No. 4,230,979 and in a publication entitled, "A High Performance Controlled Current Inverter Drive," authored by Loren H. Walker, et al., a IEEE Conference paper and appearing in the IAS *Annular Conference Record* data Oct., 1979 at pages 927–936, both of which are specifically incorporated herein by reference, there is disclosed a controlled current inverter system comprised of a thyristor bridge configuraton for supplying an AC load such as an induction motor with an AC current of variable magnitude and variable frequency. The system described therein employs a variable DC power source which is connected to a variable frequency inverter preferably by way of a DC link including an inductor. Means are included to develop signals representing the instantaneous electrical torque of the AC motor and the instantaneous angle $\theta$ (defined as the angle between the air gap flux and the stator current) which is representative of the air gap power factor. The electrical torque signal and the angle signal are utilized to control the DC current in the link and the gating angle of the inverter thyristors with respect to the motor flux such that the air gap power factor or angle $\theta$ is controlled in a predetermined manner over its prescribed operating range.

SUMMARY OF THE INVENTION

It is therefore an object of the present invention to provide an improved power conversion system, particularly as applied to the operation of an AC motor load.

It is another object of the present invention to provide a method and apparatus directed to a protective arrangement for an AC motor control and drive system.

Yet another object of the present invention is to provide an improved method and apparatus for an AC motor control and drive system which can quickly shift the operational mode of the motor in response to abnormal operating conditions.

It is a further object of the present invention to provide an improved method and apparatus for a motor control and drive system which is operative to prevent excessive circulating currents from occurring in the event of a system abnormality.

The foregoing and other objects are satisfied in accordance with the present invention through the provision of a thyristor controlled current inverter system for supplying an AC load such as an induction motor with an AC current of variable magnitude and frequency. The system employs a thyristor controlled DC power source in the form of a converter which is connected to a thyristor controlled inverter preferably by way of a DC link including an inductor. The motor drive is controlled by a single torque command signal which may be provided by a larger overall system of which the subject control and drive system is a part. In response to the torque command signal, the current in the DC link and the frequency of the inverter are controlled to thus control the motor torque and flux. In the event that the converter develops a short circuit condition, either because of a converter failure or because of converter response to control stimuli, when the motor is operating in a regenerative mode, method and apparatus are set forth in the present invention for sensing converter condition and quickly advancing the gating angle of the inverter for a brief time interval to shift motor operation from a regenerative mode toward a motoring mode, the resulting effect being to quench any excessive build-up of circulating current between the inverter, motor and converter. In a preferred embodiment, a signal generated in response to a detection of predetermined converter condition; e.g., a short circuit across the DC link, triggers a single pulse generator which operates to inject a voltage pulse into a variable frequency oscillator which in turn advances the phase of the gating angle of the inverter to cause the motor operational mode to shift from regeneration toward motoring.

BRIEF DESCRIPTION OF THE DRAWINGS

While the present invention is particularly defined in both method and apparatus claims annexed to and forming a part of this specification, a better understanding can be had from the following description taken in conjunction with the accompanying drawings, in which:

DETAILED DESCRIPTION

Figure 1:
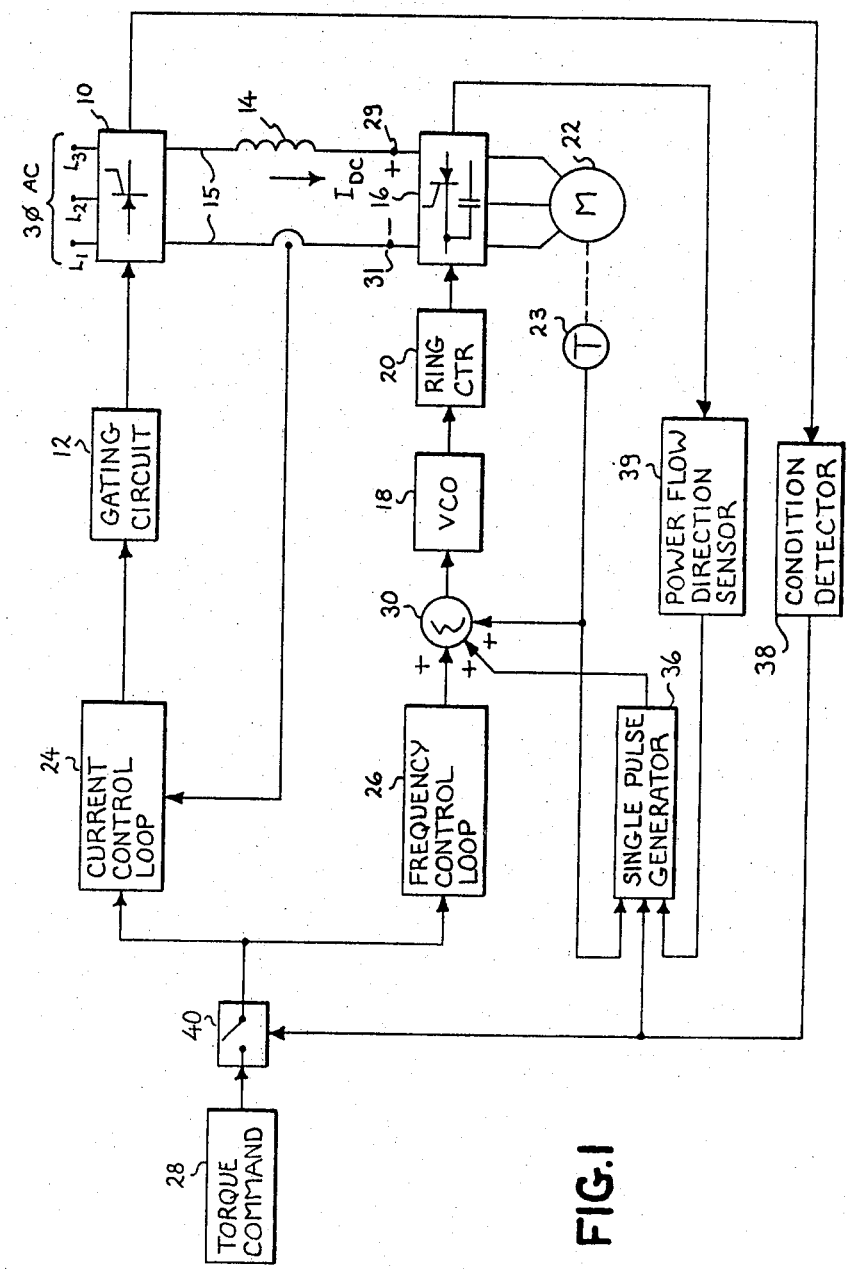
FIG. 1 is an electrical block diagram illustrating the present invention in its preferred embodiment.

Referring now to the drawings and more particularly to FIG. 1, which shows the present invention in its basic configuration, the invention centers around a controlled current inverter system including a source of variable DC current 10 which is implemented, for example, by means of a thyristor controlled AC to DC converter under the control of suitable control means 12. The means 12 comprise a thyristor gating circuit capable of generating and applying suitable gating signals to a three phase thyristor bridge circuit 10 coupled to a source of three phase (3φ) electrical power supplied via lines L$_1$, L$_2$ and L$_3$. A current I$_{DC}$ is supplied from the converter by way of a DC link circuit, including a suitable filter for smoothing DC current from the converter 10 such as an inductor 14, to a thyristor controlled inverter 16. The inverter 16 is preferably comprised of a six thyristor bridge under the control of a variable frequency oscillator, such as a voltage controlled oscillator 18 and ring counter 20. In this well known type of control, the magnitude of the input signal to the voltage controlled oscillator controls the gating frequency of the thyristors of the thyristor bridge and accordingly the output frequency of the current fed to the load 22 which preferably comprises an AC induction motor.

As is known, the instantaneous air gap power factor or phase angle θ of the motor can be varied by changing the inverter output frequency, since any difference between the frequency of motor back EMF (flux) and the frequency of inverter current will appear as a rate of change of phase angle of current with respect to flux. Accordingly, the controllable parameters are the DC link current I$_{DC}$ and the inverter frequency which are used to control torque and flux as a function of the torque command. As shown in FIG. 1, a current control loop 24 and a frequency control loop 26 are coupled to the output of a torque command block 28. The current control loop 24 has for its purpose controlling the current I$_{DC}$ by means of the gating circuit 12 coupled to the converter 10 while the frequency control loop 26 has for its purpose providing a slip command signal which is applied to a signal summing junction 30 whose output is coupled to the voltage controlled oscillator 18.

The system up to this point comprises a simplified version of the system shown and described in the aforementioned U.S. Pat. No. 4,230,979 and can be referred to should a more detailed description be desired.

The present invention has for its primary objective the prevention of undesirable current build up should the converter 10 develop or be commanded to provide a short circuit condition at a time when the motor acts as a regenerative load causing power to be fed back to the converter through the inverter and the DC link circuit. In this type of power converting motor control, power may flow either from the AC source to the motor (motoring) or from the motor to the AC source (regeneration). The sense or direction of the direct current I$_{DC}$ is, as shown by the arrow in FIG. 1, independent of the direction of power flow. The sense of DC voltage appearing across terminals 29 and 31, however, reverses as the direction of power flow reverses. The polarity of voltage across terminals 29 and 31, indicated in FIG. 1, is for power flow toward the motor 22.

Figure 3:
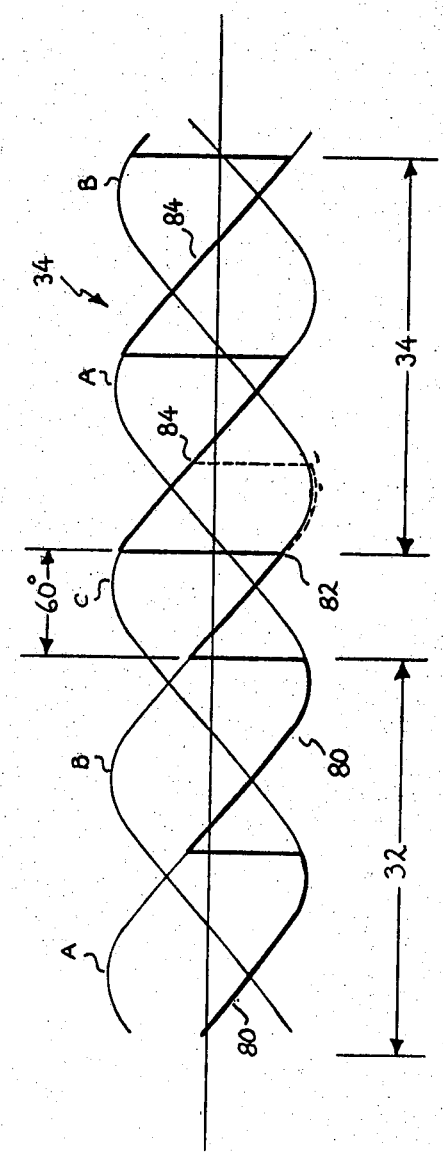
FIG. 3 is a set of voltage waveforms helpful in understanding the operation of the subject invention.

It might be said that when the power flow is toward the motor (as shown in FIG. 1) the converter voltage drives the DC current while the inverter voltage opposes the current flow and thus draws power from it. Conversely in regeneration, when polarity of the DC link voltage across terminals 29 and 31 is reversed, the inverter 16 is the source of voltage which drives the current and the converter voltage opposes the current and thus draws power from it. It is evident that any condition which causes the converter 10 to fail to exhibit an opposing voltage on the DC link, i.e. to short circuit the link, would place the entire voltage from the inverter 16 across the inductor 14. The sense of this voltage is such as to cause an ever increasing current in the inductor 14. It is readily apparent that unless immediate action is taken, the motor current will increase to unacceptable levels. It has been found that this increase in current can be controlled if the polarity of the back EMF of the motor appearing across terminals 29 and 31 of inverter 16 is quickly reversed or quenched by shifting from a regenerative mode toward a motoring mode. The system as shown in FIG. 1 is adapted to accomplish this through a momentary or transient advancement of the gating angle of the thyristors of inverter 16. This is illustrated by the waveforms of FIG. 3 in which A, B and C are motor terminal voltages, and 84 is the instantaneous voltage at the DC terminals 29, 31 of the inverter. In FIG. 3, reference numeral 32 designates the preexisting regenerative mode of operation, while reference numeral 34 designates a motoring mode of operation. It is seen that upon the advancement of the gating angle, for example by 60°, between phase B and C for one three phase interval, the required transition in operating mode takes place. Bearing in mind that the gating angle of the inverter thyristors is related to the operating frequency of the voltage controlled oscillator 18, the subject invention contemplates injecting a pulse signal of predetermined amplitude and time into the input of the voltage controlled oscillator 18 to speed up and trigger the ring counter 20 earlier than beforehand as shown.

The advancement of the gating angle is accomplished by means of a single pulse generator 36 (FIG. 1) which is triggered by an output signal from a condition detection circuit 38 along with a power flow sense signal provided from a power flow direction sensor 39. A typical example of a condition detection circuit is shown and described in U.S. Pat. No. 4,150,322, entitled, "Power Conversion System Having Inversion Fault Detecton and Correction Circuit," granted to Richard Miller, et al, on Apr. 17, 1979, which patent is also assigned to the present assignee. The teachings of this latter patent are herein incorporated by reference. The output of the condition detection circuit 38 is also coupled to and operates a normally closed electronic switch 40 coupled between the torque command block 28 and the control loops 24 and 26.

When the converter 10 causes a short circuit to be placed across the DC link 15, it is necessary to ultimately bring the motor 22 to a zero torque condition which corresponds to a zero power flow condition on the DC link. Opening switch 40 will cause the control loops 24 and 26 to bring the motor to a zero torque condition to satisfy this requirement. The response of the control loops, however, is not fast enough to prevent excessive current build up in the DC link. Accordingly the single pulse generator 36 acts in concert with switch 40 to satisfy the immediate and ultimate requirement of the system.

The power flow sensor 39 shown in FIG. 1 produces an output signal which is indicative of the direction of power flow; i.e. into or out of the inverter 16. The exact form of this sensor is not important to the present invention and the sensor may comprise merely a resistive attenuator, not shown, connected across terminals 29 and 31 of the inverter 16. The polarity of the signal from this attenuator; i.e. the output of sensor 39, is dependent upon the direction of power flow.

Figure 2:
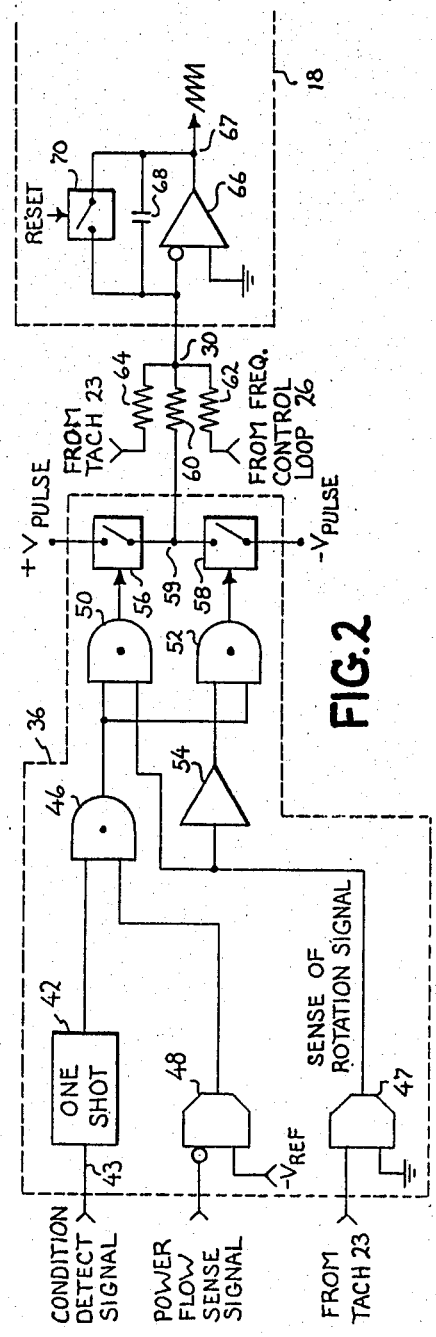
FIG. 2 is an electrical schematic diagram illustrative of the single pulse generator portion of the diagram shown in FIG. 1.

Having considered the present invention in terms of the block diagram shown in FIG. 1, reference is now made to FIG. 2, wherein there is disclosed the means by which the advance gating of the inverter 16 is implemented. The single pulse generator 36 referred to in FIG. 1 is shown in FIG. 2 comprised of, among other things, a well known one shot (monostable multivibrator) circuit 42 which is adapted to produce a single pulse of predetermined pulse width in response to a trigger signal applied thereto via signal lead 43. The trigger signal appearing on lead 43 is the output signal from the condition detection circuit 38 of FIG. 1. This single pulse is used to produce the waveform segment 44 shown in FIG. 4 in the following manner. The pulse is applied to one input of an AND gate 46 whose other input comprises an enabling signal from the output of a comparator circuit 48 which is responsive to two input signals, one being the power flow sense signal provided by the sensor 39 of FIG. 1 and a reference signal $-V_{ref}$. The power flow sense signal from the sensor 39 comprises a negative DC voltage during a regenerative mode of motor operation. Accordingly, it is compared against the negative reference $-V_{ref}$ and if the sense signal is more negative than the $-V_{ref}$ voltage, the circuit 48 produces a positive going output signal which is applied to the AND gate 46 along with the positive going pulse waveform from the one shot circuit 42. Under such conditions, the AND gate 46 puts out a positive pulse of the same pulse width as that from the one shot 42 which is applied simultaneously to two other AND gates 50 and 52 whose other inputs are derived from a sense of rotation signal of the motor 22. This latter signal is the resultant output of a comparator 47 which has a first of its inputs connected to ground and a second input connected to and receiving the output from the tachometer 23 (FIG. 1). Rotation of the motor 22 in a first direction causes AND gate 50 to be enabled, while rotation in the opposite direction will cause AND gate 52 to be enabled due to the presence of the signal inverter circuit 54. The outputs of the AND gates 50 and 52 are respectively coupled to and control a pair of electrical switch devices 56 and 58 which are adapted to close for a time period corresponding to the pulse width of the pulse from the one shot circuit 42, i.e. so long as the respective AND gate 50 or 52 is enabled. Upon closure of either switch 56 or 58, a voltage having an amplitude of either $+V_{pulse}$ or $-V_{pulse}$ will be present at circuit junction 59 for a time equal to the pulse width generated by the one short circuit 42. The sense of motor rotation determines which polarity of $V_{pulse}$ is applied to summing junction 59. The signal at junction 59 is applied to junction 30 by means of summing resistor 60 along with the slip command signal from the frequency control loop 26 (FIG. 1) via summing resistor 62 and the positive feedback signal indicative of motor speed provided by the tachometer 23. The motor speed signal is applied to the summing junction 30 by means of a summing resistor 64. The composite of these three signals appears as waveform 65 in FIG. 4.

Figure 4:
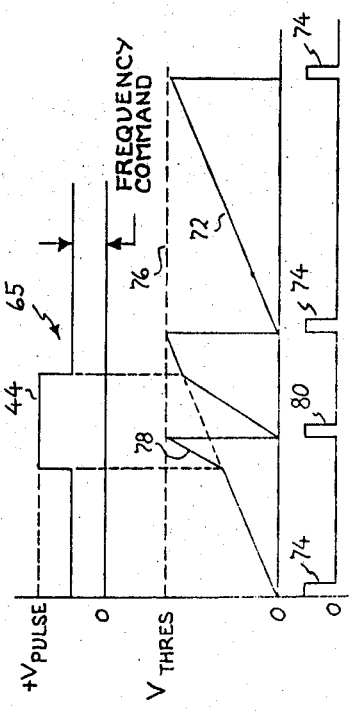
FIG. 4 is a set of voltage waveforms also helpful in understanding the operation of the subject invention.

The voltage controlled oscillator 18 shown in FIG. 1 comprises a bi-directional VCO and is of an integrated type in that it integrates the frequency command applied to summing junction 30 until the potential of the output of amplifier 66 at point 67 reaches a predetermined positive or negative value at which time the oscillator 18 produces an output pulse and resets the integrator. FIG. 2 includes an illustration of the integrator portion of the voltage controlled oscillator 18 and is shown including an operational amplifier 66 an integrator capacitor 68 and a reset switch 70. A typical example of this type of circuit is shown and described in the aforementioned Walker, et al. publication. The circuit is operative to produce a ramp voltage output as shown in FIG. 4 by the waveform 72. Output pulses 74 for triggering the ring counter 20 are produced whenever the amplitude of the ramp waveform 72 exceeds a predetermined DC threshold 76. It can be seen from FIG. 4 that in absence of the waveform 44 a regularly occurring ramp voltage 72 of constant slope will be produced by action of the integrating capacitor 68. However, upon the generation of the waveform 44 by the one shot circuit 42, the ramp voltage is caused to rise at a faster rate as indicated by waveform segment 78 due to the fact that the feedback capacitor 68 charges at a faster rate. Accordingly, the threshold value 76 will be reached at a time earlier than normal and an extra pulse 80 will be produced. This pulse 80 is produced but once with the succeeding pulses 74 appearing at their otherwise normal times.

While in the specific embodiment described a single extra pulse providing 60° phase advancement in a six-pulse inverter is utilized, it is to be understood that the phase advance may be varied, as desired, according to the application desired and equipment used, within the range of from 0 to 180 electrical degrees. This variation may be accomplished by changing either or both the amplitude and duration of the pulse 44 (FG. 4) so that the required number of extra pulses such as shown at 80 are produced.

It can be seen now with reference back to FIG. 3 that for a regenerative mode of operation as further depicted by segment 32 of the power waveforms 80 that if the gating angle is advanced 60° to point 82, for example, the operating mode of the motor will shift to a zero torque mode as depicted by segment 34 of waveforms 84, which will continue upon a regular gating sequence being thereafter applied. Thus by generating and applying a single pulse waveform 44 of predetermined width and amplitude to the voltage controlled oscillator 18 a single thyristor gating pulse will be produced earlier than usual and thus effect the 60° advanced gating desired. This provides an automatic protection against motor current build up, which would otherwise have a deleterious effect on the system operation, should a sudden short circuit condition occur in the converter 10 during a regenerative mode of motor operation.

While there has been shown and described what is at present considered to be the preferred embodiment of the present invention, modifications thereto will readily occur to those skilled in the art. It is not desired, therefore, that the invention be limited to the specific arrangements shown and described, but it is intended to cover in the appended claims all such modifications as fall within the true spirit and scope of the invention.

What is claimed is:

1. A protective circuit for an AC motor drive system utilized for supplying power of a variable current magnitude and frequency to an AC motor in response to a desired torque, comprising:
    (a) a controlled variable DC current source for providing a DC output which varies in magnitude in response to a first control signal applied thereto;
    (b) a source of variable frequency AC current for supplying current to said motor at a variable frequency in response to a second control signal applied thereto;

(c) circuit means connecting said DC current source to said source of variable frequency AC current;

(d) current control means for controlling the motor current magnitude in response to the desired torque;

(e) frequency control means for controlling motor current frequency in response to the desired torque;

(f) means for detecting a predetermined abnormal condition of said motor driven system and providing a first output signal in accordance therewith;

(g) means for detecting a regenerative operating mode of said motor and providing a second output signal in accordance therewith; and (h) means responsive to said first and second output signals and being operable to generate a signal which is coupled to said frequency control means and which acts to vary the frequency of the motor current in a predetermined manner to cause the operating mode of said motor to shift from said regenerative mode toward a motoring mode.

2. The invention in accordance with claim 1 wherein said means (h) for generating the signal for varying the frequency of the motor current comprises a signal generator for generating a signal to transiently vary the frequency of the motor current.

3. The invention in accordance with claim 2 wherein said signal generator comprises a pulse generator adapted to generate a pulse of predetermined amplitude and pulse width for increasing the frequency of the motor current.

4. The invention in accordance with claim 1 wherein said abnormal condition detecting means (f) comprises means for monitoring the operation of said DC current source.

5. The invention in accordance with claim 1
wherein said frequency control means (e) includes a variable frequency oscillator for controlling the frequency of the motor current and,
wherein said means (h) responsive to said first and second output signals comprises a signal generator coupled to said variable frequency oscillator for transiently varying the frequency of said oscillator.

6. The invention in accordance with claim 1 and additionally including:
(i) means coupled to said first and second output signals for effecting a substantially zero level of motor torque.

7. The invention in accordance with claim 1,
wherein said source of variable frequency AC current (b) comprises a pulse controlled current source,
said frequency control means (e) includes a variable frequency oscillator providing pulses of varying frequency to control said pulse controlled current source, and
wherein said means (h) responsive to said first and second output signals is operable to generate a signal to produce at least one additional output pulse to provide an advance pulsing of said pulse controlled current source which thereby acts to cause said operating mode shift.

8. The invention in accordance with claim 7
wherein said variable frequency oscillator comprises a voltage controlled oscillator having frequency controlling input means, and wherein said means (h) responsive to said first and second output signals comprises a pulse generator which produces a pulse of predetermined amplitude and pulse width which is applied to said frequency controlling input means of said voltage controlled oscillator.

9. The invention in accordance with claim 8
wherein said voltage controlled oscillator includes a circuit generating a ramp function signal which is operable to generate an output pulse upon reaching a predetermined amplitude, and
wherein said pulse of predetermined amplitude and time is effective to cause said ramp function signal to rise at a faster rate and thereby produce said at least one additional pulse in advance of a normally succeeding output pulse.

10. The invention in accordance with claim 5
wherein said source (b) of variable frequency AC current comprises a thyristor controlled inverter consisting of a plurality of thyristors connected in a predetermined circuit configuration, and
wherein said variable frequency pulses from said variable frequency oscillator are effective to control gating of said thyristors in a predetermined gating sequence.

11. The invention in accordance with claim 10 and,
additionally including a ring counter connected between said variable frequency oscillator and said thyristor circuit configuration.

12. The invention in accordance with claim 1
wherein said variable DC current source (a) comprises a thyristor controlled converter circuit consisting of a plurality of thyristors connected in a predetermined circuit configuration, and
wherein said means (f) for detecting an abnormal condition of said DC current source comprises means for detecting a short circuit condition of said thyristor circuit configuration and operable to produce said first output signal.

13. The inventon in accordance with claim 1,
wherein said source (b) of variable frequency AC current comprises a thyristor controlled inverter circuit consisting of a plurality of thyristors connected in a predetermined circuit configuration, and
wherein said means (g) for detecting a regenerative operating mode of said motor comprises a power flow direction sensor which is operable to produce said second output signal.

14. The invention in accordance with claim 13 wherein said power flow direction sensor comprises means to sense the polarity of the direct current voltage at the input of said inverter circuit.

15. The invention in accordance with claim 13 and
additionally including voltage controlled oscillator circuit means to control said inverter circuit, and
wherein said means (h) responsive to said first and second output signals comprises:
(i) a one shot pulse generator coupled to said first output signal for producing a single pulse of predetermined pulse width,
(ii) a coincidence gate having a first and second input, said first input being connected to the single pulse output of said one shot signal generator and said second input being coupled to an enabling signal, (iii) circuit means coupled to said second output signal and providing said enabling signal in response to said second output signal, said coincidence gate being operative thereby to output a single control pulse of predetermined pulse width, and additionally including, (iv) circuit means including electrically operated switch means powered by said single control pulse to couple a voltage of predetermined amplitude to said voltage controlled oscillator circuit means for a period of time equal to said pulse width.

16. The invention in accordance with claim 15 and further including, (v) circuit means coupled to said switch means and being responsive to a sensed direction of rotation of said AC motor to couple a voltage of predetermined amplitude and polarity to said voltage controlled oscillator means for a period of time equal to said pulse width.

17. A method for protecting an AC motor drive system utilized for supplying power of a variable current magnitude and frequency to an AC motor in response to a desired torque, comprising:

(a) controlling a variable DC current source to provide a DC output which varies in magnitude in response to a first control signal applied thereto;

(b) connecting said DC current source to a source of variable frequency AC current;

(c) supplying current to said motor from said source of variable frequency AC current at a variable frequency in response to a second control signal applied thereto;

(d) establishing a signal corresponding to a desired level of motor torque;

(e) generating said first control signal in a first electrical control circuit and responsive to said signal corresponding to the desired level of motor torque;

(f) generating said second control signal in a second electrical control circuit responsive to said signal corresponding to the desired level of motor torque;

(g) detecting an abnormal condition of said DC current source and providing a first output signal;

(h) detecting the operating mode of said motor and providing a second output signal in response to a regenerative operating mode; and (i) generating a signal in response to said first and second output signals for varying the frequency of the motor current in a predetermined direction to cause the operating mode of said motor to shift from a regenerative mode toward a motoring mode.

18. The method in accordance with claim 17 wherein said source of variable frequency AC current comprises a thyristor controlled inverter whose gating angle is determined in accordance with the frequency output of a variable frequency oscillator and said variable frequency oscillator is temporarily controlled to advance the gating angle of the inverter to cause the motor to shift from the existing regenerative mode toward a motoring mode.

* * * * *